Figure 22:
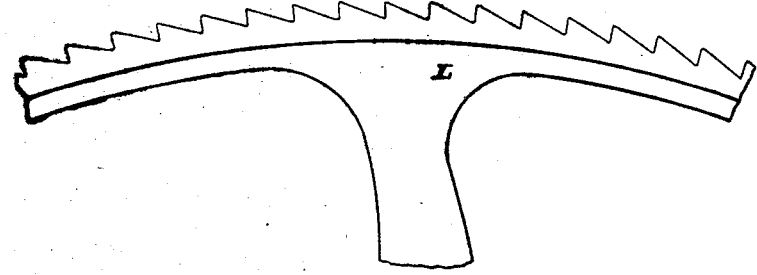

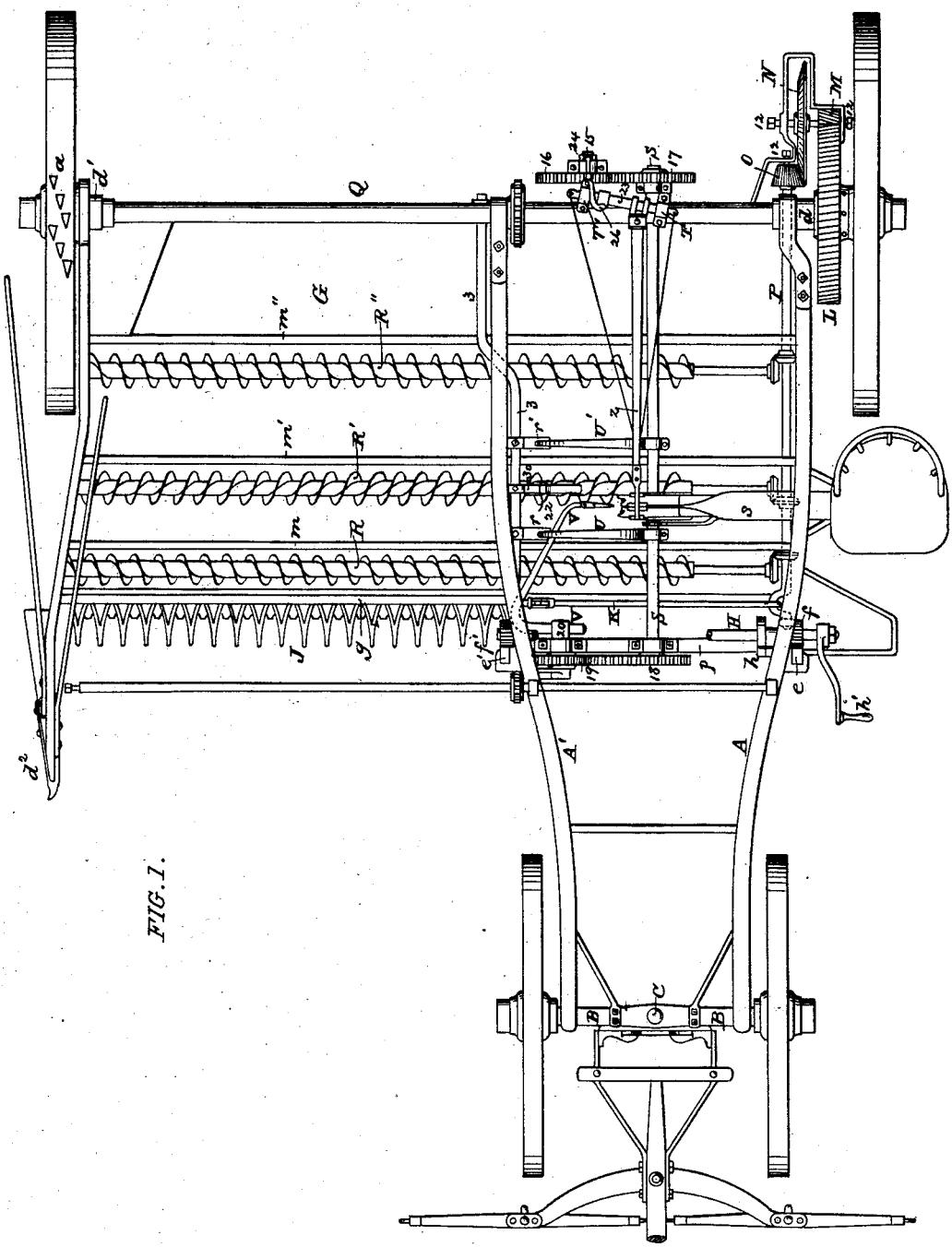

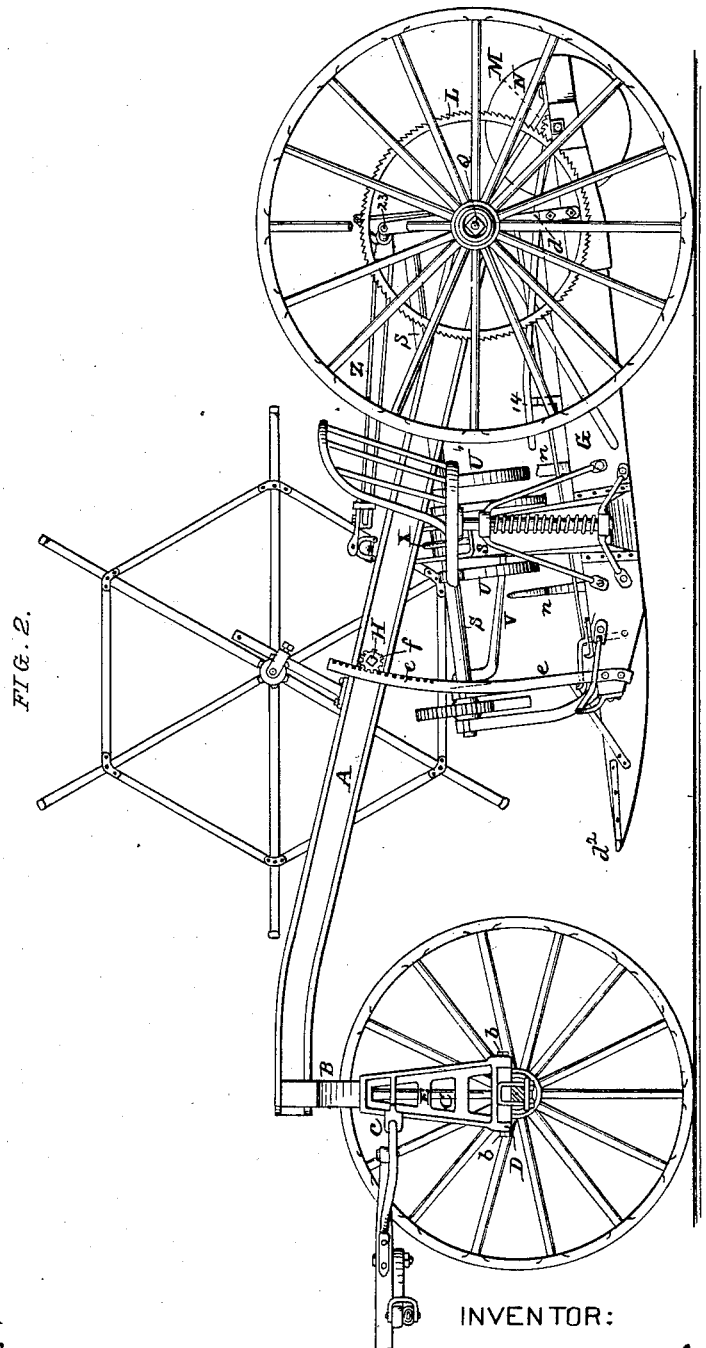

8 Sheets—Sheet 3.
E. FOOTE.
MACHINERY FOR REAPING AND BINDING GRAIN.
No. 244,876. Patented July 26, 1881.
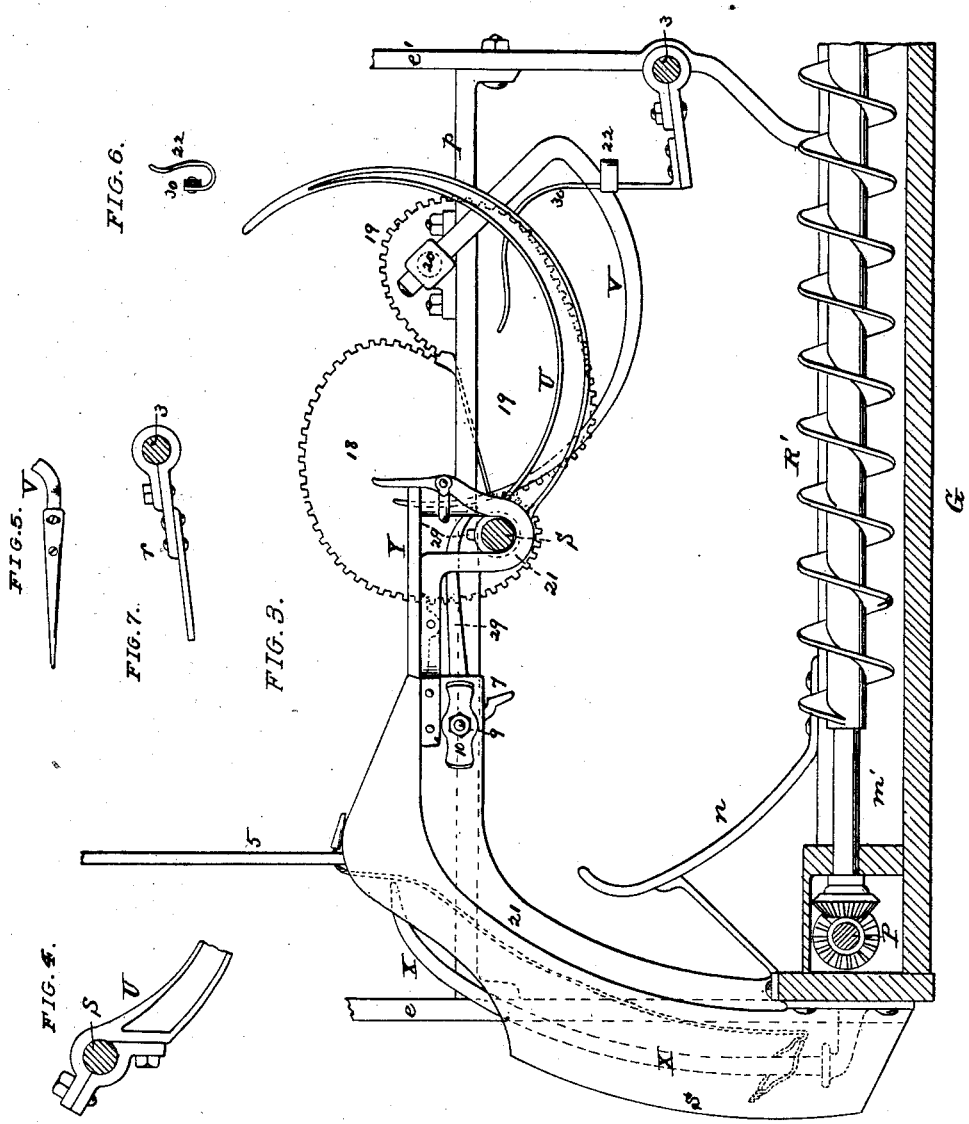
ATTEST:
Robert Burns
Frank Deffry
INVENTOR:
Elisha Foote 8 Sheets—Sheet 4.
E. FOOTE.
MACHINERY FOR REAPING AND BINDING GRAIN.
No. 244,876. Patented July 26, 1881.
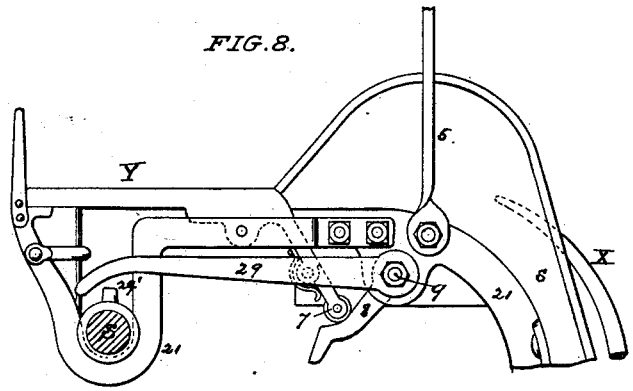
FIG. 8.
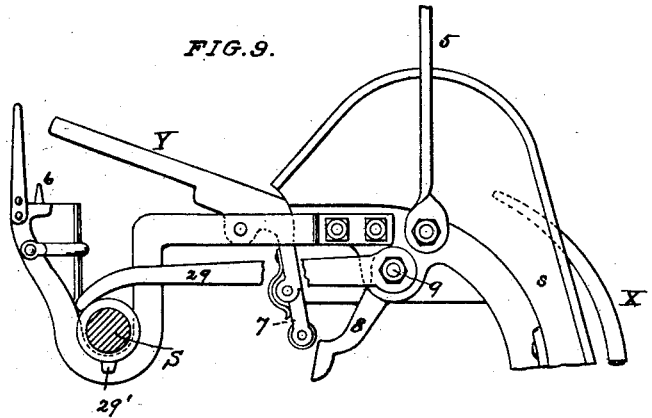
FIG. 9.
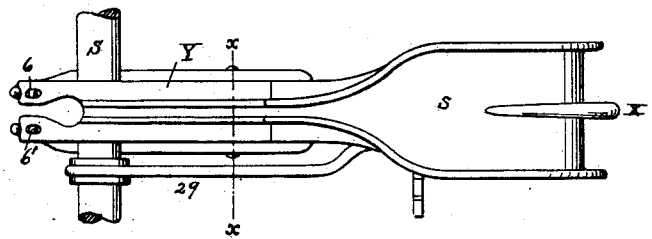
FIG. 10.
FIG. 11.
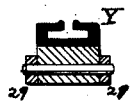
ATTEST:
Robert Burns.
Frank Duffy
INVENTOR:
Elisha Foote

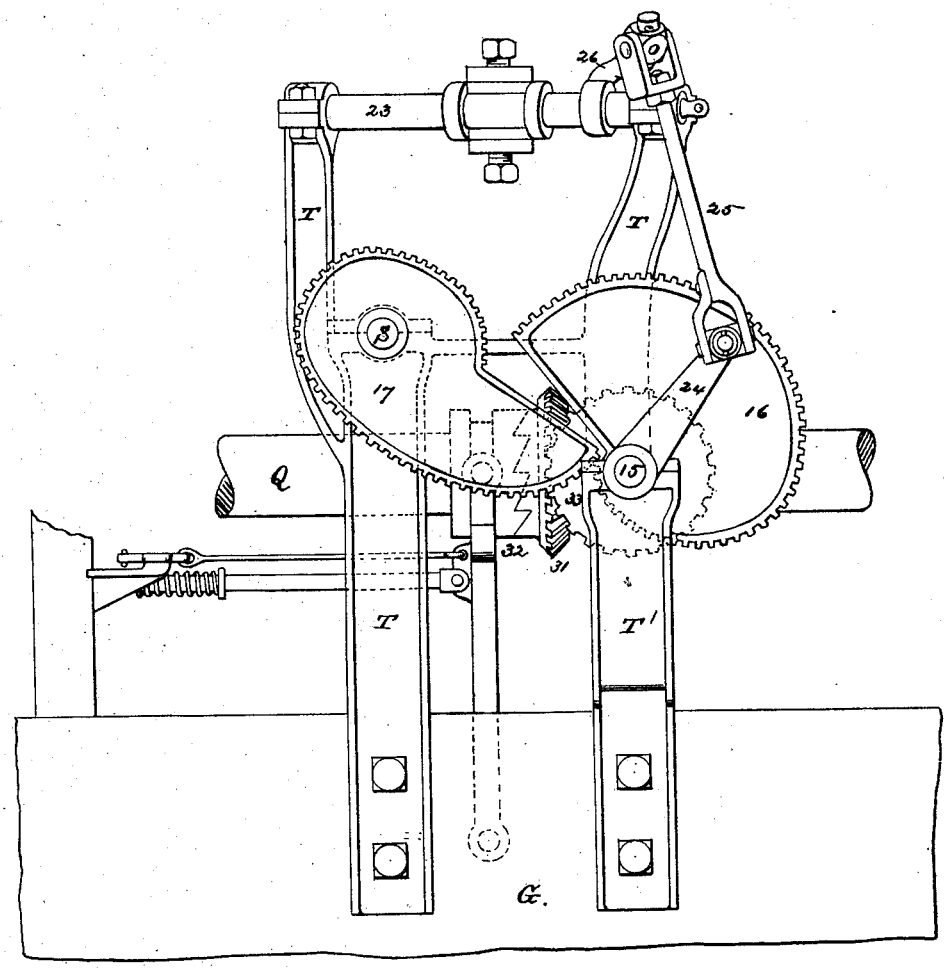

E. FOOTE.
MACHINERY FOR REAPING AND BINDING GRAIN.
No. 244,876. Patented July 26, 1881.
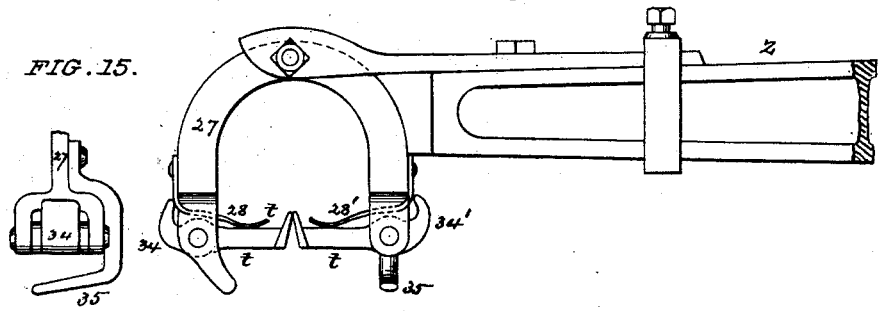
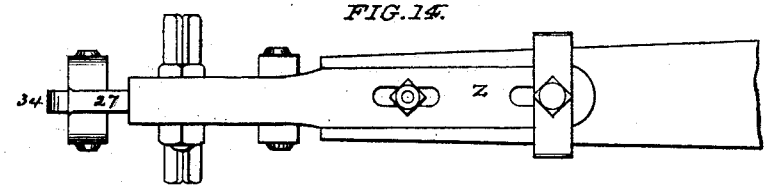
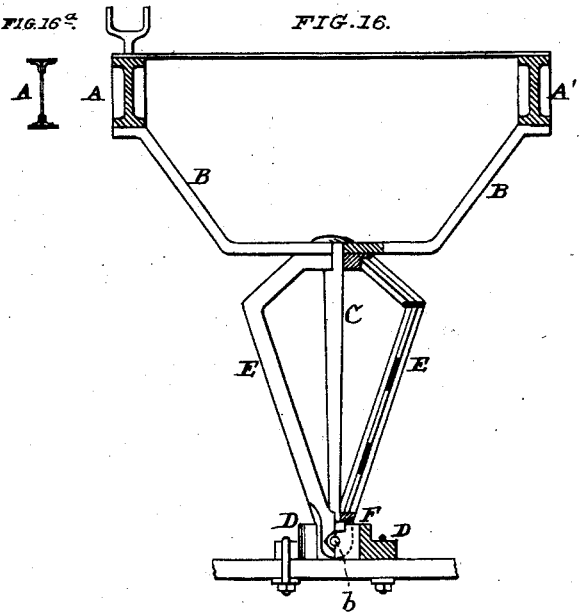
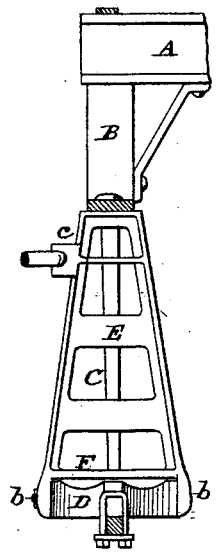
ATTEST:
Robert Burns
Charles Pickle
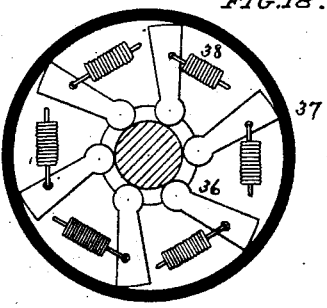
INVENTOR:
Elisha Foote E. FOOTE.
MACHINERY FOR REAPING AND BINDING GRAIN.
No. 244,876. Patented July 26, 1881.
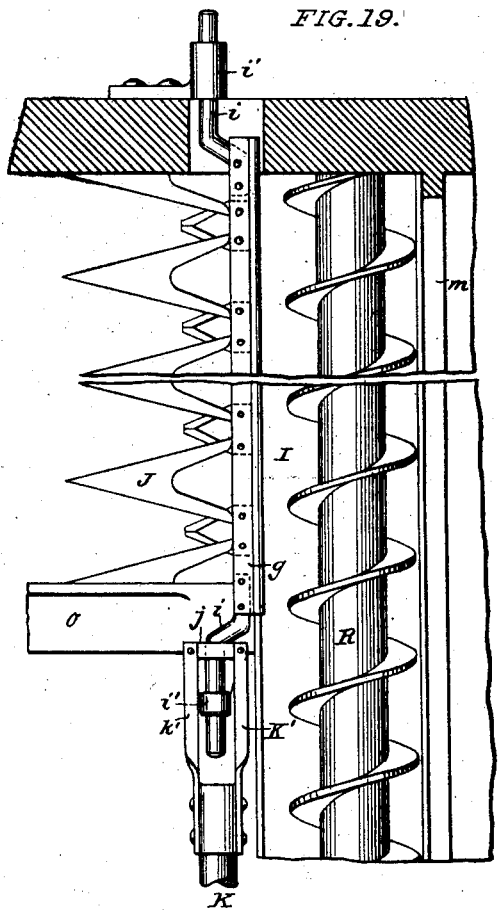
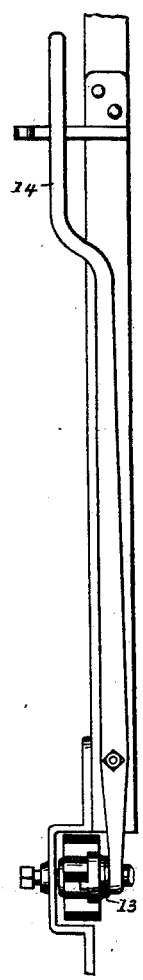
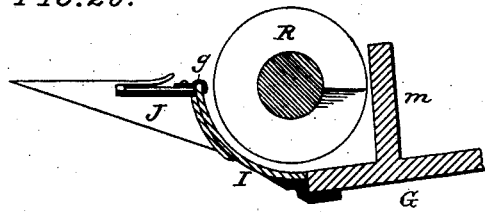
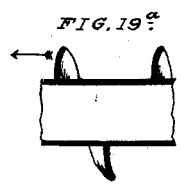
ATTEST:
Robert Burns
Charles Pickles
INVENTOR:
Elisha Foote

E. FOOTE.
MACHINERY FOR REAPING AND BINDING GRAIN.

No. 244,876. Patented July 26, 1881.

ATTEST:
Robert Burns
Charles Pickles

INVENTOR:
Elisha Foote

UNITED STATES PATENT OFFICE.

ELISHA FOOTE, OF NEW YORK, N. Y.

MACHINERY FOR REAPING AND BINDING GRAIN.

SPECIFICATION forming part of Letters Patent No. 244,876, dated July 26, 1881.

Application filed August 12, 1879.

*To all whom it may concern:*

Be it known that I, ELISHA FOOTE, of No. 12 West Thirty-ninth street, New York city, in the State of New York, have invented certain Improvements in Machinery for Reaping and Binding Grain, of which the following is a specification.

My machine cuts the grain and delivers it in bound bundles, using for the purpose the bands for which Letters Patent were granted to me on the 18th day of February, 1873, and to which reference is made. Several improvements have been made in its different parts, making the whole, when combined, a substantially new machine.

Harvesting-machines now in general use are placed on two small wheels, with most of the weight usually thrown on one of them. This in passing over soft rough ground causes a heavy draft upon the horses. More or less weight is thrown upon their necks, and they are besides much annoyed and injured by side draft and irregular side jerks when one of the wheels encounters an obstacle. To remedy these difficulties I have placed my machine on four wheels of the ordinary size of wagon-wheels—to wit, the hind wheels four feet and four inches in diameter and the front wheels three feet and six inches—and the horses are attached to a light pole like the pole of a light wagon, and the platform and driver's seat are so arranged as to throw the weight onto the four wheels as nearly equally as practicable.

Figure 1 is a top view of the whole machine;
Fig. 2, a side view of the same from the left-hand side. The other figures represent parts and detached portions of the machine, and are explained in connection with the descriptions hereinafter contained. Figs. 1 and 2 show the general arrangement of the machine.

The two front wheels are connected with the hind ones by means of two reaches, A and A'. For the sake of lightness I make them of sheet-steel in the form of beams of greatest strength, as shown by the cross-section in Fig. 16ª. They are about eight feet and six inches long, and the forward part is curved, as shown in Fig. 2, to allow the front wheels to turn under them. They are attached to main axle Q by joints that allow the axle to revolve within them. Castings riveted to the flanges are fitted to bear against the axle, and straps pass around the axle, and are bolted to the castings, as shown in Fig. 1. A strong wrought-iron bar, B, bent as shown in Fig. 16, and a rod on the top, connect together the front ends of the reaches, and to the bar is attached the king-bolt C, on which the axle of the front wheels turns. This bolt must have sufficient strength to draw the machine. It is rigidly attached to the bar.

On the middle of the front axle is fixed a casting, D, Figs. 2, 16, and 17, with projections on each side, by which it is clipped to the axle. Another malleable casting, E, connected to D by a bolt and nut, $b\ b$, terminates at the top in a horizontal plate, on which the bar B rests, and the king-bolt C passes through a hole in this plate and down through a hole in another plate, F, at the bottom, where it is secured by a nut and screw. The axle of the front wheels can then not only revolve around the king-bolt C, but can also vibrate up and down around the bolt $b\ b$, and adapt themselves to any inequalities of the ground over which they pass.

On the casting E E are two ears or projections, $c\ c$, to which the pole is attached in the usual manner. They are placed high up, near the line of draft, to prevent too much cross-strain on the reaches.

The main frame or platform G, on which the cut grain falls, is suspended at its rear end from the main axle Q by two rods, $d\ d'$, one at each end of the axle. They are rigidly attached to the platform, and extend up to the axle, with a strap around it, fastened by a slot and key in the usual manner. The platform thus vibrates upon the axle as its center. The front end of the platform is suspended from the reaches by the two rods $e$ and $e'$. The upper parts of these are curved in the arc of a circle having the main axle for its center, and have teeth that mesh into the teeth of the pinions $ff'$, keyed to the shaft H, which has its bearings in castings riveted to the reaches. This shaft has also a ratchet-wheel, $h$, with its pawl, to hold the platform from dropping, and on its end is the crank $h'$, in front of the driver's seat, by which the height of the finger-bar may be adjusted at pleasure. The sides and back of the platform I make of one-inch boards, about eight inches high. The right-hand side is curved, as shown in Fig. 1, to make a place for the wheel, and it is extended forward to make the divider $d^2$. The front end of the platform is made of a plate of iron or steel, about one-fourth of an inch thick, five inches wide, and curved in the arc of a circle, as shown by Fig. 20. The ends are riveted to castings, and the castings to the sides of the frame. This plate is also the finger-bar, to which the fingers or guards are riveted on the front or convex side. The guards are placed three inches apart from center to center. They are six inches long and at the base two and one-half inches wide, leaving a space of only one-half of an inch between them. They are provided with steel ledger-plates. (Shown by the thick black line in Fig. 20.) The upper sides of the plates are about three-eighths of an inch below the top of the finger-bar, and the portions of the fingers above the knives, or the "caps," as they are termed, are forked, as seen in Fig. 19, the middle parts being cut away, and the forks made as narrow as is consistent with the requisite strength.

The sections of the cutter-bar are made small, the cutting parts being one and one-half inch wide and one and one-half inch long. They are set three inches apart from center to center, leaving a vacant space of one and one-half inch between them. They vibrate one and one-half inch. The crank is three-fourths of an inch long. The point of the section enters but a short way—one-fourth of an inch—within the guard, and then returns. The principle is that the grain shall be carried sidewise by the guard into narrow spaces, then cut with small sections, short vibrations, and a short crank. The clogging of the guards, which would otherwise take place, is prevented by the forked caps, leaving no place in the middle for the accumulation of clogging material.

The cutter-bar or knife-bar $g$, Fig. 20, is a piece of sheet-steel. The sections are riveted to its under side. It then bends upward and around the top of the finger-bar, on which it rides, and down on the back side far enough to give proper stiffness. This makes a very light and rigid knife. The bar and its sections weigh but about one-sixth as much as those in common use.

To each end of the cutter-bar is attached by screws, so that it can be readily detached, a steel rod, $i$, Fig. 19, that bends forward to about the central line of resistance to cutting, and then to a line parallel with the cutter-bar. The last-mentioned portions are fitted to slide in their bearings $i'$ $i'$. The knives are thus supported at the rear by the finger-bar, and at the front by these bearings, and thus buttons, heretofore used to hold the knife in place, are dispensed with. Such buttons have many objections. They cannot be kept lubricated, for the incoming grain or grass wipes the oil from them. They occasion much friction, soon wear loose, and fail to hold the sections sufficiently close to the ledger-plates. The reduction of friction at a point of much velocity, of the weight to be vibrated, and of the distance to be vibrated through, has much reduced the power heretofore required to cut grain and grass.

The pitman K, I make of light wood. On one end is riveted a casting to attach it to the crank in the usual manner. On the other end are riveted two strips of flexible steel, $k'$ $K'$, twisted half-way round, so as to yield to the up-and-down motion of the crank, and attached to the cross-piece $j$, riveted to the bent rod $i$. I thus dispense with any of the joints that have been devised to connect the pitman with the knife-bar.

The gearing that drives the crank-shaft consists of two spur-wheels and two bevel-wheels. On the main axle is keyed the large spur-wheel L, with two hundred and seventy teeth, which drives the spur-pinion M, with forty teeth. On the same shaft with the spur-pinion is the large bevel-wheel N, with one hundred and sixty teeth, which drives the bevel-pinion O, with forty teeth, on the crank-shaft P. The crank makes one revolution to every six inches advance of the machine.

On the shaft of the spur-pinion is a clutch, of the usual form, 13, Fig. 21, with a lever, 14, extending forward to near the driver's seat, by which the cutting apparatus is thrown out of or into gear. On the ends of both the spur-wheel shaft and the crank-shaft are recesses, into which hardened-steel points 12 12 12, Fig. 1, are inserted, on which points they revolve.

Figure 23:
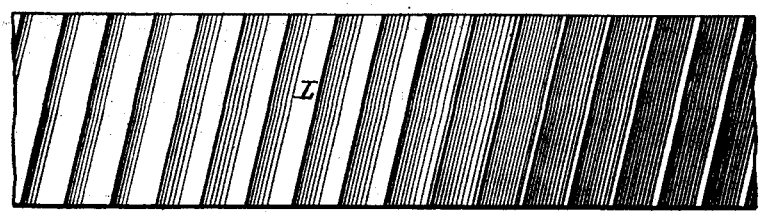
Figure 24:
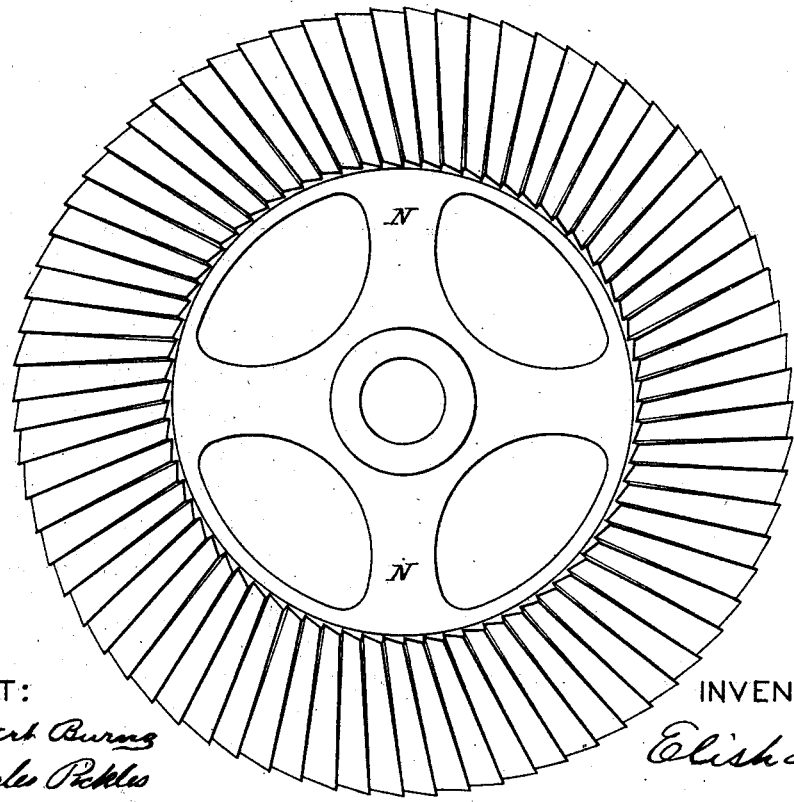

In the harvest-field much dust collects upon the gearing, and the friction between the rubbing-surfaces of teeth as they go out of and into contact causes them to wear rapidly away. To obviate this difficulty I have made the teeth of this gearing as follows:

First, spiral, as shown in Figs. 22 and 23, for the spur-gears, and as in Fig. 24 for the bevel-gears. These teeth have the property of coming into contact at points only that are in line with the centers of the wheels. There is, consequently, no rubbing out or into contact and very little friction or wear. The objection to these teeth is that they have produced an end-thrust by the obliquity of the bearing-surfaces. This I remedy by making the teeth, Secondly, like ratchet-teeth in their cross-sections, bearing only on their front faces. This enables them to be put closer together than ordinary teeth, and from the strength of their form they may be made finer also. The variation of these teeth from a line perpendicular to their movement equals the pitch of the teeth, and where they are close together and the width of the wheel is large (I make it three inches) the inclination of the faces is too small to make any end-thrust perceptible.

The grain, having fallen upon the platform, is carried sidewise to the binding apparatus by three or more screws, R R' R''. These I have made of stout tin—the cylinders two inches in diameter, the flanges one inch, except in the case of the front screw, on which the flange is one and one-half inch and the pitch three inches. The flanges are curved backward, as shown in Fig. 19ª. A rod is attached to the center of each cylinder, and forms the journals on which it revolves. They are driven by bevel-gears on the crank-shaft.

Were the grain to fall upon the cylinders of these screws it would be carried more or less endwise and go irregularly to the binder. I make what I term "ribs," m m′ m″, one at least for each screw. They are a little higher than the cylinders. They are framed into the sides of the platform and add to its stiffness. The grain falls onto these ribs and is slid over them by the action of the flanges without that of the cylinders. Further, to effect the same object I make one (the middle screw) revolve in an opposite direction to that of the others, and its flange is correspondingly changed to a left-hand screw, as seen in Fig. 1. The butt-ends of grain-stalks on the platform are more or less obstructed and held back by the uncut and incoming grain, while the heads are carried forward by the screws and reach the binder in advance of other parts of the stalk. I consequently place the front screw, R, in the concave of the finger-bar and close to the knives, so as to act directly upon the butts and carry with them some force. The flange of that screw I also make one-half of an inch deeper than the other; and, besides, I have found it quite advantageous to give to the front screw a quicker motion than the others have, so as to give a gain to the butts of about four inches in passing across the platform. The same object may be attained (though I think not so well) by giving to the front screw a greater pitch than the others have. The screws carry the grain sidewise five feet to an advance of the machine of ten feet.

Grain sometimes falls upon the platform irregularly, and it is necessary to have some means of straightening it before it is bound. This I effect by means of stops n n n, Figs. 2 and 3. Thus, if the heads be in advance they will be stopped and held by one of the stops while the butts are being brought up against the others. When grain has accumulated against the stops enough to form a bundle it is taken up by the gathering-arms U U′, Figs. 1, 2, and 3. The rods e e′, that support the front end of the platform, are placed about eight inches in advance of the finger-bar to allow the grain to pass them in going to the stops. The left-hand side of the platform is extended forward to that extent, and the rod e is attached to it. The other rod, e′, is attached to a casting that extends forward from the platform and is secured to its under side. A wooden beam connects the two projecting ends, and at about one foot and four inches above such beam a strong iron bar, p, Fig. 3, holds together the two suspending-rods e and e′, and is firmly attached and braced to them and to the beam below. On this cross-bar is bolted the front bearing of the gathering-arm shaft S. The gathering-arms U U′ are curved, as shown in Fig. 3, and they are attached to their shaft, as shown in Fig. 4. Their points pass a little outside of the stops n, and under the upper sides of the ribs m m′ m″, and take the grain from them that is within their course. The rear end of that shaft has its bearing in the casting T. (Shown in Fig. 12.) This casting is bolted to the rear end of the platform, and is further secured by clasps around the main axle.

On the main axle is a bevel-wheel, put in operation by a clutch, 32, with teeth meshing into teeth on the bevel-wheel, as shown in Fig. 12. The clutch slides on the shaft out and into gear in the usual manner. The bevel-wheel 31 drives the bevel-wheel 33 on the short shaft 15, which has one bearing on the casting and the other on a bracket riveted to the casting. On the same shaft, and attached to the bevel-wheel, is keyed the irregular spur-wheel 16, that drives the irregular spur-wheel 17 on the shaft S. The shape of these irregular wheels is shown in Fig. 12. Their form is such that in the position shown, and for about one-third of a revolution of the main shaft, the motion of the gathering-arms is very slow while the bundle is being taken from them and carried to the back of the machine. The motion then gradually increases, and the grain is picked up from the platform with a quick movement, to get out of the way of incoming grain. Then the motion diminishes until the arms come almost to a stop in the first-mentioned position.

On the front end of the shaft S is keyed the irregular gear-wheel 18, that drives the irregular wheel 19 on the shaft 20 of the carrying-arm V. This shaft has one bearing bolted to the bar p. The forward bearing is supported by two braces, one extending down to the beam below, the other sidewise to the rod e′. The bands, by the part termed the "holder," are strung upon the rod X, Fig. 3, (seen also in Figs. 8, 9, and 10, which are views from the front side,) protected by a sheet-iron case, s. The other or tip ends of the bands are inserted in a slot in the upright plate 5, wide enough for the cords but not for the tips to be drawn through.

An iron support, 21, is bolted to the side of the platform, and is bent as shown in Figs. 3 and 8. The upper end is forked, bent down and around the shaft S upon the opposite side, and supports the pins 6 6′. What I term the "receiver," Y, is attached to this fork by a pin, on which it revolves. Fig. 11 is a cross-section through the receiver at x x in Fig. 10. The internal orifice is made to fit the holder on the band, but so that it will slide easily through it. The slot on the top is wide enough for the band but not for the holder to go through. On the end of the receiver are holes that fit over the pins 6 6′, as seen in Fig. 10. The holder on the band, as it slides along through the orifice of the receiver, is arrested by these pins, and is held there until the receiver is raised far enough to allow it to escape over their tops. Fig. 8 shows the receiver down in a position to hold the band, and Fig. 9 up, to allow it to escape. The pins 6 6' are far enough apart to allow the front part of the holder to pass through and to hold onto the loop or wider part of it. I usually have two pins on each side, to make a more gradual escape of the band. Besides the holes for the pins, the receiver has through it a large orifice, corresponding in shape and size and position with the orifice of the loop when the holder is held against the pins, and through this orifice, and consequently through the loop of the holder, the other end of the band is carried by the carrying-arm V in the course of its revolutions.

The point of the carrying-arm is made detachable and adjustable sidewise, as shown in Fig. 5. It is narrow enough to pass up between the points 6 6' and through the slots in the end of the receiver.

The shape of the gears that drive the carrying-arm is shown in Fig. 3. It is such that in the position shown in that figure it stands almost stationary for about one-half of a revolution. Then it moves forward with such velocity as to avoid striking the projection by which the gathering-arm is fastened to its shaft, and to avoid striking the point of that arm, and to keep its own point at a distance of from one to one and one-half inch from the bundle as it is raised upon such arms until they come to nearly a stop in the first-mentioned position. The driver holding his reins in his left hand, with his right takes a tip from its slot and puts it onto the point of the carrying-arm, and as that moves forward it draws the band up and its holder off from the rod and into the receiver, along which the holder slides until arrested by the points 6 6'. The upper end of the case $s$ is made as shown in Figs. 9 and 10, to conduct the holder into the receiver. A small spring, 22, Figs. 3 and 6, around which the band passes, aids in drawing the holder to its place against the pins 6 and 6'. When the tip on the band has been carried through the loop and stops it is seized by the fingers of the lifting-arm and carried upward. This lifting-arm Z vibrates vertically. Its shaft 23 has its bearings on the top of the castings T T', and is placed at such an angle with the main shaft as to throw off the bundle about midway between the castings and the gearing of the crank-shaft P. The arm is attached to its shaft by a casting with screws to adjust its position, as shown in Figs 12 and 1. It receives its motion from the crank 24 on the end of the shaft 15, through the pitman 25 and the arm 26 on the shaft 23.

The fingers $t\ t$ of the lifting-arm are shown in detail in Figs. 13, 14, and 15. Their frame 27 is adjustable on the arm. To each of its prongs the fingers are attached by joints. They are free to turn upward, but can drop down no farther than to the position shown, in consequence of the prongs 34 34'. The carrying-arm carries the tip-end of the cord up between these fingers and stops, and as the lifting-arm rises its fingers scrape the tip and cord off from the point. Two light springs, 28 28', add to the gripe. While the holder of the band is held within the receiver and the arm continues to rise the band is drawn through its loop and around the bundle tighter and tighter until the strain is sufficient to raise the receiver above the points, when the holder flies forward, its converging sides embrace the cord, and the bundle is bound. The arm then lifts the bundle off from the gathering-arms, carries it to the back end of the machine, and when it has reached a point a little beyond a perpendicular the weight of the bundle pulls open the fingers and the bundle drops behind the machine. A guard, 35, is attached to deflect the cord from the joints.

The degree of tension with which the bundle is to be bound may be adjusted by the means shown in Figs. 8, 9, and 3. The receiver in the position shown in Fig. 8 cannot be raised without revolving the shaft 9, to allow the jointed stem 7 of the holder to escape from the curved arm 8, attached to such shaft. On the rear end of the shaft is attached, so as to turn with it, the elastic plate 10, Fig. 3, whose edges bear against the support and resist by their friction the revolving of the shaft, and this friction is increased or diminished by means of the screw and nut on the end of the shaft. The stem escapes from the arm a little before the holder escapes from the receiver, and then the receiver drops back by its own weight to the position in Fig. 8. On the front end of the shaft is fixed the lever 29, that extends forward to the shaft S, on which there is a cam, 29', that raises it as it revolves and carries the arm 8 back into contact with the stem.

Above the platform, far enough to be out of the way of grain on the screws, and under the right-hand reach, is placed the rod 3, bolted to the rod $e'$, and to a casting attached to rear end of the platform, and on this rod are what I term the "separators" $r\ r'$. One of them is shown separately in Fig. 7. The points of the gathering-arms, when raising a bundle, pass close to the ends of these separators, and their office is to separate and hold back any grain that may adhere to the bundle outside of the arms. On the same rod is the curved flexible slip of steel 30, Fig. 3, that serves to compress somewhat the bundle while the band is carried around it.

The hind wheels of my machine carry the axle around with them when they move forward, but turn on the axle when backed. This has been effected in the manner shown in Fig. 18. To the main axle is fixed a ring with eccentric-arms 36 attached to it by pins, on which they move. A band, 37, on the hub of the wheel, and fixed to it, extends over these arms, and they bear against its inner side, and are held in contact with it by the springs 38. This arrangement avoids the noise of the ratchet-wheel, and, what is more important, the loss of motion and clogging of the knives, that often occur when the pawl has to move forward to be in contact with a tooth. Such eccentric-arms have in different ways been adapted to other machinery and made to work successfully; but, so far as I am aware, they have never before been applied to reaping and mowing machines as I have applied them, or been made to operate successfully on such machines.

To increase the adhesion of the wheels to the ground triangular projections are punched up in the tires of the hind wheels. Some of these are shown at a, Fig. 1.

In drawing the irregular spur-gearing I have found it convenient to attach to the shafts, in place of the gears, two equal circular disks, whose diameters nearly touch each other. The shafts and disks are then revolved and placed in the several relative positions it is intended they shall occupy when in gear, and their several positions are marked on both disks by a line joining their centers and numbered consecutively each alike. The disks are then drawn on paper, the centers having the same distance apart as that of the centers of the shaft, and the marked lines are drawn as radii and numbered as on the disks. Then, commencing at No. 1, curves for the pitch-lines of both wheels are drawn to No. 2 at such distances from their centers as shall make the lengths of the lines equal, and also make the sum of two corresponding radii of each equal to the distance apart of the centers, and so on around the circles.

It much facilitates the work to use two small chains. Fasten the ends of each to the drawing-board on Nos. 1 with pins, count off an equal number of links from each to reach to Nos. 2, and attach them at proper distances from the centers, as above stated, and so on around, and the chains will trace the proper curves for the pitch-lines.

Many forms of irregular gearing are known in mechanics. If they revolve instead of reciprocate they have some regular curve for their pitch-lines. It is, I believe, new to make revolving gearing, such as above described, that cause arms upon their shafts to move with varying and irregular velocity and pass certain points at determined times in their revolutions.

The bundle may be dropped onto the ground behind the machine, or onto a slide that shall ease the fall, or onto a rack that shall hold ten or twelve bundles and drop them in a pile to form a shock.

The several parts of the above-described machine that I claim to be new and desire to secure by Letters Patent are as follows, to wit:

1. In a reaping-machine, the combination of four bearing-wheels, a main axle driven by the two hind wheels, two reaches connecting the front bearing-wheels with the rear axle and drivers, and a platform suspended in front from said reaches and in the rear from the main axle, substantially as shown and described.

2. The means described of adjusting the height of the finger-bar, to wit: two racks attached to the front end of the platform, in combination with two pinions attached to a shaft on the reaches with crank and ratchet-wheel, substantially as set forth.

3. In a reaping-machine, the two reaches A and A', in combination with front wheels and with a platform suspended from and in front of the main axle, substantially as described.

4. The sheet-metal reaches, with webs and flanges, constructed in the manner and form substantially as shown and described.

5. In connection with the front wheels of a reaping-machine, the piece E, to which the pole is attached, on which the reaches bear, and which is joined to a casting on the axle by a bolt, b, that allows such wheels to vibrate in a vertical plane, as well as horizontally, on the king-bolt C, substantialy as described.

6. The curved finger-bar forming the front of the platform, extending up above the ledger-plates, and carrying the knife-bar upon its upper edge, substantially as described.

7. The curved knife-bar g, made of sheet metal, attached to the upper side of the sections, and bending up and around the finger-bar and riding thereon, substantially as described.

8. The bent slides attached to each end of the knife, and sliding in bearings that are in advance of the bases of the sections, substantially as described.

9. The means described for supporting the knife, to wit: at its base the upper edge of the finger-bar, and in front the bearings forward of the bases of the sections, and at the sides, out of the way of incoming grain, where they may be kept lubricated, substantially as described.

10. As a connection between the pitman and the knife of reaping and mowing machines, the flexible strips K' k', attached to the cross-piece j, in combination with the bearing i', substantially as and for the purposes set forth.

11. The finger-guards, of the forms and relative sizes and arrangements described, namely: having bases five times as wide as the interval between them, and placed at a distance from center to center equal to six times said intervals, in combination with a cutter-knife having sections three times as wide as said intervals, and arranged at a distance from center to center equal to that of the guards, or twice the width of the sections, with a throw equal to the width of the sections, all which sizes and proportions to be as, or substantially as, specified.

12. In a reaping or mowing machine, the short driving-crank, with means for driving the same, in combination with the cutter-bar and knife-sections, and guards proportioned, and spaced, and arranged in relation to each other substantially as specified and shown.

13. In the cutting apparatus of reaping and mowing machines, the combination of the following parts, having dimensions substantially as specified, or such parts being proportioned to each other substantially as such dimensions, to wit: guards or fingers with forked caps two and one-half inches wide at their bases, and placed at such distance apart as to leave an open space between them at their bases of one-half an inch, cutter-sections one and one-half inch wide at their bases, and placed three inches apart from center to center, and driving-crank three-fourths of an inch long, giving to the knife a vibration of one and one-half inch, all constructed and arranged substantially as and for the purposes specified.

14. The combination of a curved finger-bar and the screw R, placed in its rear and in its concave, so as to be near the cutters, substantially as described.

15. The combination of the carrying-screws R, R′, and R″ with ribs that hold the grain above the cylinders of the screws, substantially as and for the purposes described.

16. Such screws, in combination with the ribs m and stops n, substantially as described.

17. The combination of said screws and ribs, with one of said screws revolving in a direction opposite to that of the others, substantially as and for the purposes described.

18. The combination of said screws and ribs, with the front screw made to revolve faster than the others, or to have a flange with more pitch than the others, substantially as and for the purposes described.

19. In the gearing that drives the crank-shaft of reaping and mowing machines, the peculiar form of teeth above described, to wit: wide spiral teeth and like ratchet-teeth in their cross-sections, substantially as and for the purposes set forth.

20. The apparatus for binding grain, constructed substantially as described, to wit: the revolving gathering-arms that take up the grain, the carrying-arm that carries the band around the bundle, the receiver that holds the bands and adjusts the tension, and the lifting-arm, with its fingers, that tightens the band and throws the bundle from the machine.

21. In such binding apparatus, the revolving gathering-arms that take up the grain, constructed substantially as shown.

22. In such binding apparatus, the receiver that holds the bands and adjusts the tension, constructed substantially as described.

23. In such binding apparatus, the carrying-arm that carries the band around the bundle and through the loop of the holder, constructed substantially as described.

24. In such binding apparatus, the lifting-arm, with its fingers, that tightens the band and throws the bundle off from the machine, constructed substantially as described.

25. The irregular gears 16 and 17, whereby the requisite variable motions are imparted to the gathering-arms by continuous rotation, substantially as shown and specified.

26. The irregular gears 18 and 19 for imparting by continuous rotation the requisite variable motions to the carrying-arm, all constructed substantially as shown and specified.

ELISHA FOOTE.

Witnesses:
WILLIAM GRICE,
JOHN FISHER.